(12) United States Patent
Ma et al.

(10) Patent No.: US 11,141,716 B2
(45) Date of Patent: Oct. 12, 2021

(54) METAL/ALPHA-MOC1-X LOAD-TYPE SINGLE-ATOMIC DISPERSION CATALYST, SYNTHESIS METHOD AND APPLICATIONS

(71) Applicant: PEKING UNIVERSITY, Beijing (CN)

(72) Inventors: Ding Ma, Beijing (CN); Lili Lin, Beijing (CN); Siyu Yao, Beijing (CN)

(73) Assignee: Peking University, Beijing (CN)

(*) Notice: Subject to any disclaimer, the term of this patent is extended or adjusted under 35 U.S.C. 154(b) by 292 days.

(21) Appl. No.: 16/311,160

(22) PCT Filed: Jun. 21, 2017

(86) PCT No.: PCT/CN2017/089332
§ 371 (c)(1),
(2) Date: Dec. 18, 2018

(87) PCT Pub. No.: WO2017/219977
PCT Pub. Date: Dec. 28, 2017

(65) Prior Publication Data
US 2019/0193060 A1 Jun. 27, 2019

(30) Foreign Application Priority Data
Jun. 23, 2016 (CN) .......................... 201610462928.0

(51) Int. Cl.
*B01J 27/22* (2006.01)
*B01J 37/32* (2006.01)
(Continued)

(52) U.S. Cl.
CPC .............. *B01J 27/22* (2013.01); *B01J 23/42* (2013.01); *B01J 23/44* (2013.01); *B01J 23/462* (2013.01);
(Continued)

(58) Field of Classification Search
CPC ....................................................... B01J 27/22
(Continued)

(56) References Cited

U.S. PATENT DOCUMENTS 9,579,636 B1 * 2/2017 Roy ..................... B01J 35/1014
9,694,351 B1 * 7/2017 Roy ....................... B01J 35/023
(Continued)

FOREIGN PATENT DOCUMENTS

CN 102728849 A 10/2012
CN 103566935 A 2/2014
(Continued)

OTHER PUBLICATIONS

Effects of Transition Metal Addition on the Solid-State Transformation of Molybdenum Trioxide to Molybdenum Carbides Kyung Tack Jung et al. Chem. Mater. V 16, pp. 307-314 (Year: 2004).*
(Continued)

*Primary Examiner* — Douglas B Call
(74) *Attorney, Agent, or Firm* — Umberg Zipser LLP; Jason Tejani

(57) ABSTRACT

A metal/α-MoC$_{1-x}$ load-type single-atomic dispersion catalyst, a synthesis method therefor, and applications thereof. The catalyst uses α-MoC$_{1-x}$ as carrier, and has metal that has the mass fraction ranging from 1-100% and that is dispersed on carrier α-MoC$_{1-x}$ in the single atom form. The catalyst provided in the present application can be adapted to a wide alcohol/water proportion in hydrogen production based on aqueous-phase reforming of alcohols, outstanding hydrogen production performance can be obtained at a variety of proportions, and catalysis performance of the catalyst is much higher than that of metal loaded with an oxide carrier. Especially when the metal is Pt, catalysis performance of the catalyst provided in the present application in the hydrogen production based on aqueous-phase reforming of alcohols is
(Continued)

much higher than that of a Pt/α-MoC$_{1-x}$ load-type catalyst on the α-MoC$_{1-x}$ carrier on which Pt is disposed on a layer form in the prior art. The hydrogen production performance of the catalyst provided in the present application can be higher than 20,000 h$^{-1}$ at the temperature of 190° C.

16 Claims, 6 Drawing Sheets

(51) Int. Cl.
| | | |
|---|---|---|
| C01B 3/32 | (2006.01) | |
| B01J 35/10 | (2006.01) | |
| B01J 35/00 | (2006.01) | |
| B01J 37/08 | (2006.01) | |
| B01J 37/02 | (2006.01) | |
| B01J 23/42 | (2006.01) | |
| B01J 23/44 | (2006.01) | |
| B01J 23/46 | (2006.01) | |
| B01J 23/72 | (2006.01) | |
| B01J 23/75 | (2006.01) | |
| B01J 23/755 | (2006.01) | |
| B01J 37/04 | (2006.01) | |
| B01J 37/18 | (2006.01) | |
| B01J 35/02 | (2006.01) | |

(52) U.S. Cl.
CPC ............... *B01J 23/72* (2013.01); *B01J 23/75* (2013.01); *B01J 23/755* (2013.01); *B01J 35/002* (2013.01); *B01J 35/0013* (2013.01); *B01J 35/0046* (2013.01); *B01J 35/0073* (2013.01); *B01J 35/023* (2013.01); *B01J 35/1004* (2013.01); *B01J 35/1009* (2013.01); *B01J 35/1014* (2013.01); *B01J 35/1019* (2013.01); *B01J 37/0201* (2013.01); *B01J 37/0236* (2013.01); *B01J 37/04* (2013.01); *B01J 37/082* (2013.01); *B01J 37/084* (2013.01); *B01J 37/088* (2013.01); *B01J 37/18* (2013.01); *B01J 37/32* (2013.01); *C01B 3/32* (2013.01); *C01B 3/326* (2013.01); *B01J 37/0213* (2013.01); *C01B 2203/0227* (2013.01); *C01B 2203/107* (2013.01); *C01B 2203/1052* (2013.01); *C01B 2203/1058* (2013.01); *C01B 2203/1064* (2013.01); *C01B 2203/1076* (2013.01); *C01B 2203/1217* (2013.01); *C01B 2203/1223* (2013.01); *C01B 2203/1229* (2013.01)

(58) Field of Classification Search
USPC ........................................................ 423/648.1
See application file for complete search history.

(56) References Cited

U.S. PATENT DOCUMENTS

| | | | |
|---|---|---|---|
| 2004/0062710 | A1 | 4/2004 | Seegopaul et al. |
| 2007/0179050 | A1* | 8/2007 | Ma .................. B01J 27/22 502/182 |
| 2012/0253085 | A1* | 10/2012 | Johnston ............... C07C 29/149 568/885 |
| 2014/0230264 | A1* | 8/2014 | Dvorsk .................. B82Y 30/00 34/284 |

FOREIGN PATENT DOCUMENTS

| | | |
|---|---|---|
| CN | 104707636 A | 6/2015 |
| CN | 105540588 A | 5/2016 |
| JP | 2004523459 A | 8/2004 |
| JP | 2005138006 A | 6/2005 |

OTHER PUBLICATIONS

Ma et al., "Highly-efficient steam reforming of methanol over copper modified molybdenum carbide," RSC Adv., Sep. 5, 2014; 4(83):44175-44184.

Ma et al., "Low-temperature steam reforming of methanol to produce hydrogen over various metal-doped molybdenum carbide catalysts," International Journal of Hydrogen Energy, Nov. 6, 2013; 39(1):258-266.

Gu, Xiang Kui, "Density Functional Theory Studies on Hydrogen Production from Methanol Steam Reforming," Dalian Institute of Chemical Physics, May 2012; 5 pgs.

First Office Action for Japanese Application No. 2018-566830, dated Nov. 26, 2019; 7 pgs.

* cited by examiner

METAL/ALPHA-MOC1-X LOAD-TYPE SINGLE-ATOMIC DISPERSION CATALYST, SYNTHESIS METHOD AND APPLICATIONS

This application claims the priority of Chinese Patent Application No. 201610462928.0, now granted as CN107008479B, with the title of "METAL/α-MoC$_{1-x}$ LOAD-TYPE SINGLE-ATOMIC DISPERSION CATALYST, SYNTHESIS METHOD AND APPLICATIONS", filed on Jun. 23, 2016 before the State Intellectual Property Office of China, which is hereby incorporated by reference in its entirety.

FIELD OF THE INVENTION

The present application relates to the field of metal catalysis, in particular to metal/α-MoC$_{1-x}$ supported single-atomic dispersion catalyst, synthesis method and applications.

BACKGROUND OF THE INVENTION

The exhaust gas and dust pollutant generated from fossil fuel utilization have far exceeded the self-purification capacity of the environment. Development of clean alternative energy is not only the effective solution to energy crisis, but also the critical method dealing with environmental problems. Hydrogen energy is widely recognized as a clean power source with high gravimetric energy density. Hydrogen fuel cells have been acknowledged as the most efficient way to utilize hydrogen energy in the near future. Comparing to the internal combustion engine system, the energy conversion efficiency of hydrogen fuel cells can increase by 40%-50%. However, due to the limitation of current hydrogen storage technology (relatively low volumetric energy density and safety concerns on the high pressure tanks and vessels), the wide application of hydrogen energy is still not feasible. By storing the hydrogen in a form of liquid compounds (methanol, formic acid or ammonia) and then the releasing in situ through certain catalytic reactions for use in a fuel cell, both of the problems (low volumetric density and pressure of container) could be effectively solved. As a result, this storage strategy can be accepted as the next generation technique.

Methanol is the most promising candidate for hydrogen storage. First, methanol can be produced at large scale in chemical industry which is comparable to the annual production of petroleum. At the same time, methanol has a high H/C ratio leading to strong hydrogen storage capacity. In addition, as the methanol does not contain C—C bonds, the hydrogen release reaction from methanol could be performed at mild condition and the selectivity to byproducts could be effectively inhibited. At present, reforming reaction is the applied technique to extract hydrogen from methanol. Classified by the reaction medium, it could be divided into methanol steam reforming and aqueous phase reforming. For the steam reforming, the present studies mainly focus on Cu-based catalysts and noble metal (Group VIII) catalysts. Cu-based catalysts generally work in the temperature range of 250-300° C. with high reactivity. However, the active phases tend to be oxidized by steam and over 40% deactivation would occur when the reactor restarts. On the other hand, the noble metal loaded over oxide supports is more favorable to catalyze the decomposition reaction of methanol, resulting in over 50% CO in the final products, which far exceeds the tolerance of the fuel cell system (hydrogen fuel cells operating below 100° C. could bear less than 50 ppm CO impurity in the hydrogen fuel; while the high temperature fuel cells operating at the range of 100-200° C. may work under 5% CO contamination). Besides, the steam reforming reaction requires vaporization of the reactants and further purification stacks, which does not fit for compact system. In comparison, the aqueous reforming not only remove the vaporization stack but also would reduce the CO impurity in the product due to the boosted water gas shift activity in the aqueous medium. These advantages make the aqueous phase methanol reforming reactor easier to integrate with the hydrogen fuel cell system. However, the conventional Cu-based catalyst cannot be stably present in a liquid phase, and the oxide support noble metal catalyst has extremely low activity and does not meet the requirements for use.

SUMMARY OF THE INVENTION

In order to solve the problem of low activity of the conventional catalyst in the aqueous phase reforming reaction, the present application provides a metal/α-MoC$_{1-x}$ supported single-atomic dispersion catalyst, its synthesis method and applications. The technical solution is as follows:

The present application firstly presents a metal/α-MoC$_{1-x}$ supported single-atomic dispersion catalyst, with α-MoC$_{1-x}$ as a support and metal as an active component. And 1-100% of the loaded metal is dispersed on the support α-MoC$_{1-x}$ in single-atomic form.

In a specific embodiment of the present application, 10-100% of the metal, preferably 90-100% of the metal, more preferably 100% of the metal is dispersed on the support α-MoC$_{1-x}$ in single-atomic form.

In a specific embodiment of the present application, the metal supported amount is 0.01-50% by mass, preferably 0.01-10% by mass, more preferably 0.01-2% by mass, most preferably 0.05-0.2% by mass based on the total mass of the support.

In a specific embodiment of the present application, the metal is at least one selected from of a group consisting of platinum, ruthenium, palladium, nickel, copper and cobalt.

The present application further provides a preparation method of the above metal/α-MoC$_{1-x}$ supported single-atomic dispersion catalyst, comprising:

Step 1) synthesis of the support α-MoC$_{1-x}$

The support α-MoC$_{1-x}$ in this step is α-phase molybdenum carbide, face-centered cubic structure, x=0-0.9, preferably 0-0.5; the support has a size of 1 nm-30 nm, and the specific surface area is between 5 m$^2$/g and 250 m$^2$/g. Its synthesis method is the prior art, which is not defined herein by the present application. Those skilled in the art can realize the synthesis of the support α-MoC$_{1-x}$ by the existing method. For example, the support α-MoC$_{1-x}$ can be synthesized by following method:

A) The molybdenum trioxide is temperature programmed to 500-900° C. in an ammonia gas reaction atmosphere for 0.5-50 hours, and then cooled to room temperature in an ammonia gas reaction atmosphere; wherein the heating rate is 1-50° C./min, and the ammonia gas flux corresponding to the molybdenum source per gram is 5-800 mL/min.

B) The reaction atmosphere is switched to methane and hydrogen gas, and is temperature programmed to 500-900° C. for 0.5-50 hours, and then cooled to room temperature in methane and hydrogen atmosphere; wherein, the heating rate is 1-50° C./min, the flux of methane and hydrogen gas corresponding to the molybdenum source per gram is 5-800 mL/min, and the volume ratio of methane to hydrogen gas is 1:9 to 9:1;

C) The reaction atmosphere is switched to atmosphere for passivation, and is temperature programmed to 500-900° C. for 0.5-50 hours, and then cooled to room temperature in the atmosphere for passivation; wherein, the heating rate is 1-50° C./min, the flux of atmosphere for passivation corresponding to the molybdenum source per gram is 5-400 mL/min. The atmosphere for passivation contains oxygen gas and argon gas, and the volume of oxygen gas accounts for 0.1-1% of the volume of the atmosphere for passivation.

Step 2) The metal precursor salt is dissolved to obtain a metal precursor salt solution.

In a specific embodiment, the metal precursor salt may be dissolved in any volatile solvent, preferably water. It should be understood that the metal precursor is water soluble salt at this time. Said metal in the metal precursor salt is preferably selected from the group consisting of metallic element in Group VIII of the periodic table of elements, more preferably at least one selected from a group consisting of platinum, ruthenium, palladium, nickel, copper and cobalt.

In a specific embodiment of the present application, the metal precursor salt is preferably at least one selected from of a group consisting of dipotassium tetrachloroplatinate, disodium tetrachloroplatinate, platinum bis(acetylacetonate), chloroplatinic acid, palladium chloride, palladium acetate, nickel chloride, copper chloride, cobalt chloride, nickel nitrate, copper nitrate, cobalt nitrate, nickel acetylacetonate, copper acetylacetonate and cobalt acetylacetonate.

Step 3) The metal precursor salt solution in the step 2) is mixed with the support $\alpha$-MoC$_{1-x}$ in the step 1) and dried to obtain a solid, wherein the mass of the metal element in the metal precursor salt is 0.01%-55%, preferably 0.01%-12%, more preferably 0.06%-0.25% of the mass of the support $\alpha$-MoC$_{1-x}$, based on the mass of the metal element in the metal precursor salt, the loaded amount of the product can be adjusted by adjusting the ratio of the amount of the metal precursor salt to the support $\alpha$-MoC$_{1-x}$.

In a specific embodiment, when the metal precursor salt solution is mixed with the support $\alpha$-MoC$_{1-x}$, the support $\alpha$-MoC$_{1-x}$ may be first immersed in a solvent, preferably water, and then the metal precursor salt solution is added thereto, and then the mixture is uniformly stirred and dried to remove the volatile solvent. The drying process in this step can be carried out by a drying method commonly used in the art, which is not defined herein by the present application and can be realized, for example, by rotary evaporation.

Step 4) The solid obtained in the step 3) is lyophilized to obtain a catalyst precursor. The main purpose of this step is to prevent the catalyst precursor from being oxidized deeply, and the lyophilization can reduce the influence of water evaporation on the distribution of the precursor salt on the catalyst. In a specific embodiment, this step can be carried out by lyophilizing overnight in a lyophilizer.

The lyophilizer is a conventional device commonly used, which is not defined herein by the present application.

Step 5) The obtained catalyst precursor is carburized in a carburization gas atmosphere containing both a carbon source and a hydrogen source to obtain a metal/$\alpha$-MoC$_{1-x}$ supported single-atomic dispersion catalyst.

In a specific embodiment, the carbon source is at least one selected from a group consisting of alkane, olefin, and alcohol, preferably methane or ethane; the hydrogen source is preferably hydrogen gas; and the volume ratio of the carbon source to the hydrogen source is 0.1:9 to 9:1, and the rate of temperature programming for carburization is 1-50° C./min, preferably 1-30° C./min, more preferably 1-10° C./min, most preferably 5-10° C./min; the highest temperature of carburization is 490-900° C., preferably 590-700° C. During the carburization process, it is maintained at 200-300° C. for 0.1-50 hours, preferably 0.1-10 hours, more preferably 0.5-3 hours, most preferably 1-2 hours; at the highest temperature of carburization for 0.1-100 hours, preferably 0.1-10 hours, preferably 0.5-3 hours, more preferably 1-2 hours.

The inventors have surprisingly discovered through experiments that the metal/$\alpha$-MoC$_{1-x}$ supported single-atomic dispersion catalyst prepared by the present invention uses $\alpha$-MoC$_{1-x}$ as a support, a metal as an active component, and some or all of the metal exhibits single-atomic dispersed form on the support. And as the metal loaded amount decreases, the amount of metal single-atomic dispersion will gradually increase; for example, in the specific embodiment of the present application, when the metal loaded amount is 10%, about 10% of the metal is dispersed on the support in the single-atomic form, as the metal loaded amount decreases, the amount of metal single-atomic dispersion will gradually increase; when the metal loaded amount is less than or equal to 0.2%, the metal is completely dispersed on the support $\alpha$-MoC$_{1-x}$ in the single-atomic form. In the present application, the loaded amount of the metal is controlled to 0.01%-10%, preferably 0.01-2%, more preferably 0.05-0.2% by adjusting the ratio of the amount of the metal precursor salt to the support $\alpha$-MoC$_{1-x}$, so that 10% to 100% of the metal is dispersed on the support $\alpha$-MoC$_{1-x}$ in single-atomic form, and more preferably the metal is completely dispersed on the support $\alpha$-MoC$_{1-x}$ in the single-atomic form. The loaded amount of the metal element on the final catalyst can be determined by ICP (Inductively Coupled Plasma Spectrometer).

The metal/$\alpha$-MoC$_{1-x}$ supported single-atomic dispersion catalyst provided by the present application can be applied to the hydrogen production reaction of alcohol aqueous phase reforming. In a specific embodiment, the alcohol can be methanol, ethanol, glycerol or ethylene glycol, and preferably methanol. When the catalyst provided by the present application is used for the catalytic reaction, the reaction temperature is 50-280° C., preferably 190° C. The catalyst provided by the present application has a wide ratio of alcohol/water in the hydrogen production reaction of alcohol aqueous phase reforming, and excellent hydrogen production performance can be obtained by various ratios, and the ratio of alcohol to water can be 0.1:9 to 10:1.

It should be noted that the term "about" as used in this application, for example, when modifying the final loaded amount, generally means within the error range allowed in the art, such as ±10%, ±5%, and ±2%.

In the present application, the term "loaded amount" refers to the mass percentage of the metal loaded on the support as an active component. For example, when loaded amount is 10%, it is understood that the metal accounted for 10% by mass of the support is loaded on the support.

In the present application, when describing the amount of metal single-atomic dispersion, the used percentages are all mass percentage.

The metal/$\alpha$-MoC$_{1-x}$ supported single-atomic dispersion catalyst provided by the present application uses $\alpha$-MoC$_{1-x}$ as the support and metal as the active component, and 1-100% of said metal is dispersed on the support $\alpha$-MoC$_{1-x}$ in single-atomic form. The catalyst provided by the present application has a wide ratio of alcohol/water in the hydrogen production reaction of alcohol aqueous phase reforming, and excellent hydrogen production performance can be obtained by various ratios, and the catalytic performance is much better than that of oxide supported metal catalysts. Especially when the metal is Pt, the Pt/α-MoC$_{1-x}$ supported single-atomic dispersion catalyst provided by the present application has much better catalytic performance in the hydrogen production of alcohol aqueous phase reforming than that of Pt/α-MoC$_{1-x}$ supported catalyst in the prior art, which Pt is dispersed in a layer form on the α-MoC$_{1-x}$ support. The hydrogen production performance of the catalyst provided by the present application can be higher than 20,000 h$^{-1}$ at the temperature of 190° C.

DESCRIPTION OF THE DRAWINGS

In order to illustrate the examples of the present application and the technical solutions of the prior art more clearly, the drawings that need to use in the examples and the prior art will be briefly introduced. Obviously, the drawings described following are only some examples of the present application, and those skilled in the art can obtain other drawings according to these drawings without any creative work.

DETAILED DESCRIPTION OF THE INVENTION

Figure 1:
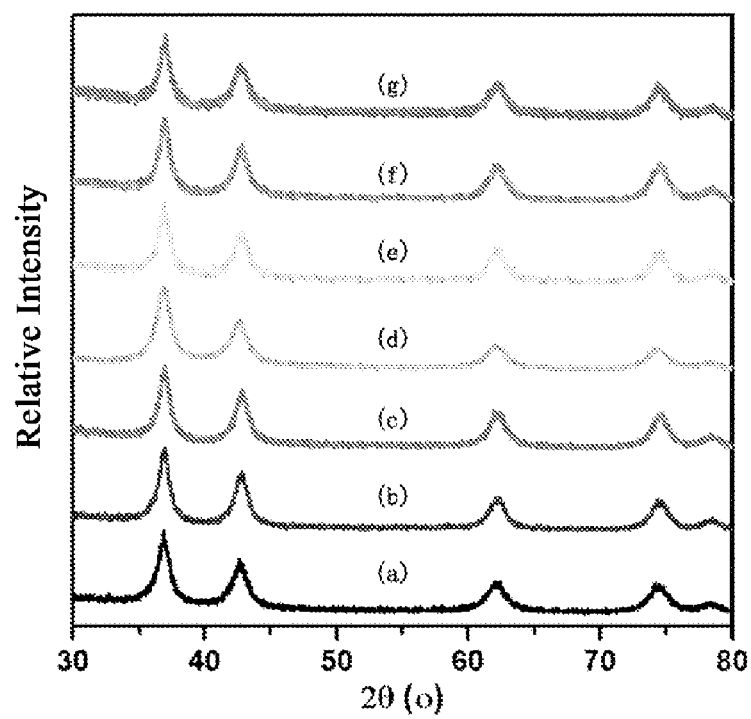
FIG. 1 is an XRD pattern of the support α-MoC$_{1-x}$ prepared in Example 1 and the catalysts prepared in Examples 2, 5, 6, 7, 8, and 9, wherein (a) in FIG. 1 is an XRD pattern of support α-MoC$_{1-x}$ prepared in Example 1; (b) in FIG. 1 is an XRD pattern of the catalyst prepared in Example 2; (c) in FIG. 1 is an XRD pattern of the catalyst prepared in Example 5; (d) in FIG. 1 is an XRD pattern of the catalyst prepared in Example 6; (e) in FIG. 1 is an XRD pattern of the catalyst prepared in Example 7; (f) in FIG. 1 is an XRD pattern of the catalyst prepared in Example 8; and (g) in FIG. 1 is an XRD pattern of the catalyst prepared in Example 9.

In order to illustrate the objects, the technical solutions, and the advantages of the present application more clearly, the present application will be further described in detail below with reference to the drawings and examples. It is apparent that the described examples are only a part of the examples of the present application, not all of examples. All other examples obtained by the ordinary skilled in the art without creative work based on the examples of the present application are within the scope of the present application.

EXAMPLE 1

Preparation of Support α-MoC$_{1-x}$ 1 g of molybdenum trioxide was ground to smaller than 60 mesh, placed in a quartz tube, and it was temperature programmed to 700° C. in an ammonia gas reaction atmosphere for 1 hour, and then cooled to room temperature in an ammonia gas reaction atmosphere; wherein, the heating rate was 10° C./minute, the flux of ammonia gas was 20 mL/min;

The reaction atmosphere was switched to methane and hydrogen gas, and it was temperature programmed to 700° C. for 1 hour, and then cooled to room temperature in a methane and hydrogen atmosphere; wherein the heating rate was 10° C./min, the flux of methane and hydrogen gas was 20 mL/min, the volume ratio of methane to hydrogen gas was 3:7;

The reaction atmosphere was switched to an atmosphere for passivation, and it was temperature programmed to 700° C. for 1 hour, and then cooled to room temperature in the atmosphere for passivation; wherein, the heating rate was 10° C./minute, and the flux of atmosphere for passivation was 20 mL/minute. The atmosphere for passivation contained oxygen gas and argon gas, and the volume of oxygen gas accounted for 0.5% of the volume of atmosphere for passivation. Finally, 0.7 g of α-MoC$_{1-x}$ was obtained. The prepared support α-MoC$_{1-x}$ was specifically α-MoC$_{0.8}$ as determined by elemental analysis.

EXAMPLE 2

Synthesis of Pt/α-MoC$_{0.8}$ Supported Single-Atomic Dispersion Catalyst (Loaded Amount of 0.2%)

The support α-MoC$_{0.8}$ (0.2 g) prepared in the same manner as Example 1 was placed in a flask, and 10 mL of deionized water was added to make the support completely under the liquid level. 1 g of chloroplatinic acid hexahydrate (platinum precursor salt) was dissolved in 10 mL of water to prepare Pt solution; 25 μL of Pt solution was added to a flask equipped with support α-MoC$_{0.8}$, stirring for 2 hours, and the water in the flask was evaporated with a rotary evaporator and then a sample obtained was placed in a lyophilizer to lyophilize overnight. The catalyst precursor was then carburized in CH$_4$/H$_2$ atmosphere (volume ratio of methane to hydrogen gas was 3:17), heated to 300° C. at the rate of 10° C./minute, maintained at 300° C. for one hour, and then heated to 590° C. at the rate of 10° C./min, maintained for 120 minutes. Finally, the loaded amount was determined to be about 0.2% by ICP (Inductively Coupled Plasma Spectrometer).

EXAMPLE 3

Synthesis of Pt/α-MoC$_{0.8}$ Supported Single-Atomic Dispersion Catalyst (Loaded Amount of 0.05%)

The support α-MoC$_{0.8}$ (0.2 g) prepared in the same manner as Example 1 was placed in a flask, and 10 mL of deionized water was added to make the support completely under the liquid level. 1 g of chloroplatinic acid hexahydrate (platinum precursor salt) was dissolved in 10 mL of water to prepare Pt solution; 5 μL of Pt solution was added to a flask equipped with support α-MoC$_{0.8}$, stirring for 2 hours, and the water in the flask was evaporated with a rotary evaporator and then a sample obtained was placed in a lyophilizer to lyophilize overnight. The catalyst precursor was then carburized in CH$_4$/H$_2$ atmosphere (volume ratio of methane to hydrogen gas was 3:17), heated to 300° C. at the rate of 10° C./min, maintained at 300° C. for 1 hour, and then heated to 590° C. at the rate of 10° C./min, maintained for 120 minutes. Finally, the loaded amount was determined to be about 0.05% by ICP.

EXAMPLE 4

Synthesis of Pt/α-MoC$_{0.8}$ Supported Single-Atomic Dispersion Catalyst (Loaded Amount of 2%)

The support α-MoC$_{0.8}$ (0.2 g) prepared in the same manner as Example 1 was placed in a flask, and 10 mL of deionized water was added to make the support completely under the liquid level. 1 g of chloroplatinic acid hexahydrate (platinum precursor salt) was dissolved in 10 mL of water to prepare Pt solution; 150 μL of Pt solution was added to a flask equipped with support α-MoC$_{0.8}$, stirring for 2 hours, and the water in the flask was evaporated with a rotary evaporator and then a sample obtained was placed in a lyophilizer to lyophilize overnight. The catalyst precursor was then carburized in CH$_4$/H$_2$ atmosphere (volume ratio of methane to hydrogen gas was 1:9), heated to 200° C. at the rate of 5° C./min, maintained at 200° C. for 2 hours, and then heated to 700° C. at the rate of 5° C./min, maintained for 60 minutes. Finally, the loaded amount was determined to be about 2% by ICP.

EXAMPLE 5

Synthesis of Pd/α-MoC$_{0.8}$ Catalyst (Loaded Amount of 2%)

The support α-MoC$_{0.8}$ (0.2 g) prepared in the same manner as Example 1 was placed in a flask, and 10 mL of deionized water was added to make the support completely under the liquid level. 1 g of palladium chloride (precursor salt) was dissolved in 10 mL of 2 mol/L hydrochloric acid to prepare Pd solution; 8 μL of Pd solution was added to a flask equipped with support α-MoC$_{0.8}$, stirring for 2 hours, and the water in the flask was evaporated with a rotary evaporator and then a sample obtained was placed in a lyophilizer to lyophilize overnight. The catalyst precursor was then carburized in CH$_4$/H$_2$ atmosphere (volume ratio of methane to hydrogen gas was 9:1), heated to 300° C. at the rate of 10° C./min, maintained at 300° C. for 1 hours, and then heated to 590° C. at the rate of 10° C./min, maintained for 120 minutes. Finally, the loaded amount was determined to be about 2% by ICP.

EXAMPLE 6

Synthesis of Ru/α-MoC$_{0.8}$ Catalyst (Loaded Amount of 2%)

The support α-MoC$_{0.8}$ (0.2 g) prepared in the same manner as Example 1 was placed in a flask, and 10 mL of deionized water was added to make the support completely under the liquid level. 1 g of ruthenium chloride (precursor salt) was dissolved in 10 mL of water to prepare Ru solution; 10 μL of Ru solution was added to a flask equipped with support α-MoC$_{0.8}$, stirring for 2 hours, and the water in the flask was evaporated with a rotary evaporator and then a sample obtained was placed in a lyophilizer to lyophilize overnight. The catalyst precursor was then carburized in C$_2$H$_6$/H$_2$ atmosphere (volume ratio of ethane to hydrogen gas was 3:17), heated to 300° C. at the rate of 10° C./min, maintained at 300° C. for 1 hours, and then heated to 490° C. at the rate of 10° C./min, maintained for 10 hours. Finally, the loaded amount was determined to be about 2% by ICP.

EXAMPLE 7

Synthesis of Ni/α-MoC$_{0.8}$ Catalyst (Loaded Amount of 2%)

The support α-MoC$_{0.8}$ (0.2 g) prepared in the same manner as Example 1 was placed in a flask, and 10 mL of deionized water was added to make the support completely under the liquid level. 1 g of nickel nitrate was dissolved in 10 mL of water to prepare a Ni solution; 25 μL of Ni solution was added to a flask equipped with support α-MoC$_{0.8}$, stirring for 2 hours, and the water in the flask was evaporated with a rotary evaporator and then a sample obtained was placed in a lyophilizer to lyophilize overnight. The catalyst precursor was then carburized in CH$_4$/H$_2$ atmosphere (volume ratio of methane to hydrogen gas was 3:17), heated to 300° C. at the rate of 10° C./min, maintained at 300° C. for 1 hours, and then heated to 590° C. at the rate of 10° C./min, maintained for 120 minutes. Finally, the loaded amount was determined to be about 2% by ICP.

EXAMPLE 8

Synthesis of Cu/α-MoC$_{0.8}$ Catalyst (Loaded Amount of 2%)

The differences between Example 8 and Example 7 were in that 1 g of cupric nitrate was dissolved in 10 mL of water to prepare Cu solution; 25 μL of Cu solution was added to a flask equipped with support α-MoC$_{0.8}$ for impregnation. Finally, the loaded amount was determined to be about 2% by ICP.

EXAMPLE 9

Synthesis of Co/α-MoC$_{0.8}$ Catalyst (Loaded Amount of 2%)

The differences between Example 9 and Example 7 were in that 1 g of cobalt nitrate was dissolved in 10 mL of water to prepare Co solution; 25 μL of Co solution was added to a flask equipped with support α-MoC$_{0.8}$ for impregnation. Finally, the loaded amount was determined to be about 2% by ICP.

EXAMPLE 10

Synthesis of Pt/α-MoC$_{0.8}$ Supported Single-Atomic Dispersion Catalyst (Loaded Amount of 10%)

The support α-MoC$_{0.8}$ (0.2 g) prepared in the same manner as Example 1 was placed in a flask, and 10 mL of deionized water was added to make the support completely under the liquid level. 1 g of chloroplatinic acid hexahydrate (platinum precursor salt) was dissolved in 10 mL of water to prepare a Pt solution; 610 μL of Pt solution was added to a flask equipped with support α-MoC$_{0.8}$, and stirred for 2 hours, and the water in the flask was evaporated with a rotary evaporator and then a sample obtained was placed in a lyophilizer to lyophilize overnight. The catalyst precursor was then carburized in CH$_4$/H$_2$ atmosphere (volume ratio of methane to hydrogen gas 0.1:9), heated to 200° C. at the rate of 10° C./min, maintained at 200° C. for 10 hours, and then heated to 900° C. at the rate of 30° C./min, maintained for 10 minutes. Finally, the loaded amount is determined to be about 10% by ICP.

COMPARATIVE EXAMPLE 1

Synthesis of Pt/α-MoC$_{1-x}$ Catalyst (Ammonium Heptamolybdate) (Loaded Amount of 2%)

1 g of ammonium heptamolybdate was dissolved in 10 mL of deionized water, stirred until being completely dissolved, 1 g of chloroplatinic acid hexahydrate (platinum precursor salt) was dissolved in 10 mL of water, and the aqueous solution of chloroplatinic acid was added into the ammonium molybdate solution, stirred for 2 hours until the precipitation was completed, and evaporated to dryness in an oil bath at 100° C., ground and placed in an oven at 60° C. for 3 hours. Then the catalyst precursor was placed in a muffle furnace for calcination, and it was temperature programmed to 500° C. for 120 minutes. The catalyst precursor was then carburized in 20% CH$_4$/H$_2$ atmosphere and it was temperature programmed to 700° C. for 120 minutes. In the catalyst prepared in this comparative example, Pt was present as dispersed nanoparticle form.

COMPARATIVE EXAMPLE 2

Synthesis of Pt/Al$_2$O$_3$ Catalyst (Loaded Amount of 2%)

1 g of chloroplatinic acid hexahydrate (platinum precursor salt) was dissolve in 10 mL of water. 650 μL of platinum precursor salt and 150 μL of water was mixed to form a 800 μL solution, then adding 800 μL solution into 0.8 g of Al$_2$O$_3$ (equal volume impregnation), stirred to dryness and placed in an oven at 60° C. for 3 hours, then the catalyst precursor was placed in a muffle furnace for calcination, and it was temperature programmed to 500° C. for 120 minutes. The catalyst precursor was then reduced in H$_2$ atmosphere, and it was temperature programmed to 500° C. and maintained at 500° C. for 120 minutes.

COMPARATIVE EXAMPLE 3

Synthesis of Ni/Mo$_2$C Catalyst (Loaded Amount of 2%)

1 g of ammonium heptamolybdate was dissolved in 10 mL of deionized water, stirred until being completely dissolved, 1 g of nickel nitrate hexahydrate (precursor salt) was dissolved in 10 mL of water, and 25 μL of aqueous solution of nickel nitrate was added to the ammonium heptamolybdate solution, and stirred for 2 hours until the precipitation was completed, evaporated to dryness in an oil bath at 100° C., ground and placed in an oven at 60° C. for 3 hours, and then the catalyst precursor was placed in a muffle furnace for calcination, and it was temperature programmed to 500° C. at a rate of 10° C./min, maintained for 120 minutes. The catalyst precursor was then carburized in 20% CH$_4$/H$_2$ atmosphere, heated to 300° C. at a rate of 5° C./min, and then raised to 700° C. at a rate of 1° C./min, maintained for 120 minutes. For the synthesis method, see Ma, Y, et al., International Journal of Hydrogen Energy, 2014. 39(1): p. 258-266.

COMPARATIVE EXAMPLE 4

Synthesis of Ni/Al$_2$O$_3$ Catalyst (Loaded Amount 2%)

1 g of nickel nitrate hexahydrate was dissolved in 10 mL of water, 100 μL of nickel nitrate was added into 0.8 g of Al$_2$O$_3$, stirred to dryness and placed in an oven at 60° C. for 3 hours, and then the catalyst precursor was placed in a muffle furnace for calcination. It was temperature programmed to 500° C. at a rate of 10° C./min, maintained for 120 minutes. The catalyst precursor was reduced in an atmosphere of H$_2$, and the temperature was heated to 500° C. at a rate of 5° C./min and maintained at 500° C. for 120 minutes.

COMPARATIVE EXAMPLE 5

Preparing Pt/α-MoC$_{1-x}$ supported catalyst as described in Example 1 of the Chinese Patent Application No. 201510053793.8, with the title of "Pt/α-MoC$_{1-x}$ supported catalyst, synthesis method and application thereof", wherein Pt was dispersed on α-MoC$_{1-x}$ support in a layer form.

Characterization and Testing

XRD Characterization

The support α-MoC$_{0.8}$ prepared in Example 1 and the catalysts prepared in Examples 2, 5, 6, 7, 8 and 9 were characterized by XRD to observe the phase structure thereof; the XRD sample was prepared as follows: the above carburized catalyst was passivated with a passivation gas of 0.5% O$_2$/Ar for 8 hours, and ground for using in an XRD test. The results are shown in FIG. 1. It can be seen from FIG. 1 that the support α-MoC$_{0.8}$ is an α phase, and the metals in Examples 2, 5, 6, 7, 8 and 9 are not present in the form of dispersed nanoparticle.

Proof of Single Atom of Pt in Pt/α-MoC$_{0.8}$ Supported Single-Atomic Dispersion Catalyst Prepared in Example 2

Transmission Electron Microscopy Characterization

Figures 2A, 2B:
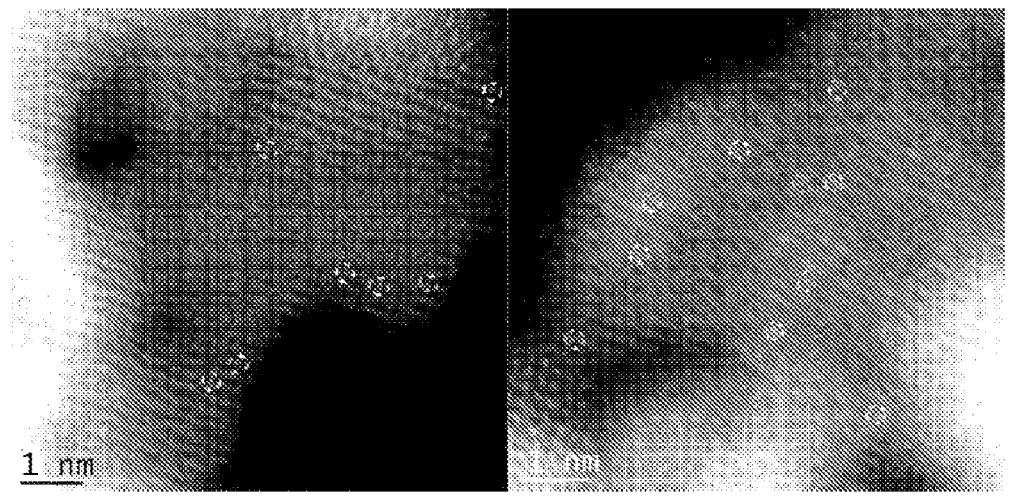
FIG. 2A is a scanning transmission electron micrograph of the catalyst prepared in Example 2 before the catalytic reaction.
FIG. 2B is a scanning transmission electron micrograph of the catalyst prepared in Example 2 after the catalytic reaction.

The preparation method of the transmission electron microscope sample was as follows: the catalyst obtained in Example 2 and the catalyst of Example 2 after performing the methanol aqueous phase hydrogen production reaction were placed in a glove box respectively; after grinding, the solid was introduced into deoxygenated anhydrous ethanol to disperse; a few drops of the dispersed droplets were added dropwise on the ultrathin carbon film for transmission electron microscopy, air-dried, and then sent into the transmission electron microscope for testing. The results are shown in FIGS. 2A and 2B, wherein the catalyst obtained in Example 2 before the reaction is shown in FIG. 2A, while the catalyst after the reaction is shown in FIG. 2B. It can be seen from FIG. 2A and FIG. 2B that the Pt atoms are dispersed on the α-MoC$_{0.8}$ support in the form of single atom (Pt atoms are the dots in circle in the figure) no matter before or after the reaction. This indicates that the catalyst prepared in Example 2 has a good stability and does not agglomerate after the catalytic reaction.

Figure 3:
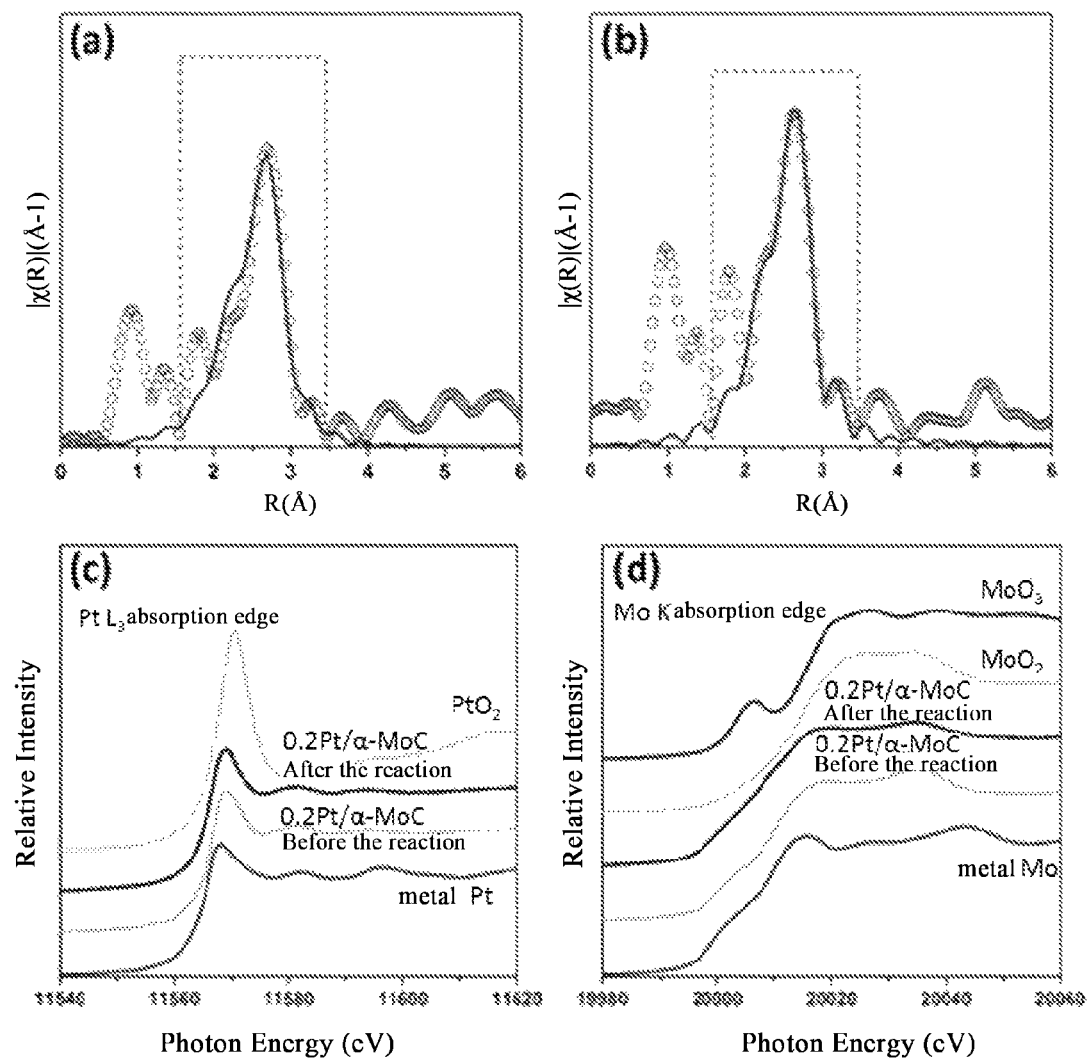
FIG. 3 is an X-ray absorption fine structure (XAFS) spectrum characterization result of the catalyst prepared in Example 2, wherein (a) in FIG. 3 is an EXAFS fitting graph of the Pt L3 absorption edge in the catalyst before the catalytic reaction; (b) in FIG. 3 is an EXAFS fitting graph of the Pt L3 absorption edge in the catalyst after the catalytic reaction; (c) in FIG. 3 is an XANES fitting graph of the Pt L3 absorption edge in the catalyst before and after the reaction; and (d) in FIG. 3 is an XANES graph of the Mo K absorption edge in the catalyst before and after the reaction.

In order to further demonstrate that the Pt element in the catalyst prepared in Example 2 were all dispersed on the α-MoC$_{0.8}$ support in the form of single atom, the catalyst obtained in Example 2 and the catalyst of Example 2 after performing the methanol aqueous phase hydrogen production reaction were respectively characterized by X-ray absorption fine structure spectrum (XAFS), and their X-ray absorption fine structure spectrum were obtained, and the extended edge was analyzed and fitted (EXAFS). XAFS is a powerful tool for depicting bulk phase structure, it adjusts X-ray energy to be consistent with the elements of the studied sample, and then monitors the functional relationship between the amount of x-rays absorbed and their energy. With sufficient accuracy, the spectrum will exhibit small oscillations, which is the result of the local environment's effect on the basic absorption probability of the target element. By analyzing and fitting the extended edge (EXAFS), the distance between absorbed atoms and neighbor atoms, the number and type of these atoms and the oxidation state of the absorbed elements can be obtained, which are the parameters for determining local structure. The results are shown in FIG. 3 and Table 1, wherein (a) in FIG. 3 is an EXAFS fitting graph of the Pt L3 absorption edge in the catalyst before the reaction; (b) in FIG. 3 is the EXAFS fitting graph of the Pt L3 absorption edge in the catalyst after the reaction; (c) in FIG. 3 is the XANS graph of the Pt L3 absorption edge in the catalyst before and after the reaction; and (d) in FIG. 3 is the XANS graph of the Mo absorption K edge in the catalyst before and after the reaction.

TABLE 1

EXAFS Data Fitting of Pt L3 Absorption Edge of Catalyst After the Reaction or Before the Reaction

| Catalyst | Coordination Shell | Bond Length (Å) | Coordination Number | E0 Displacement (ev) | Structural Disorder |
|---|---|---|---|---|---|
| Before the reaction | Pt—Pt | — | — | 5.9 | — |
| | Pt—Mo | 2.5 +/− 0.01 | 6.8 +/− 1.0 | | 0.015 |
| After the reaction | Pt—Pt | — | — | 5.9 | — |
| | Pt—Mo | 2.85 +/− 0.01 | 6.8 +/− 1.0 | | 0.013 |

It can be seen from Table 1 that the coordination number (C.N.$_{Pt-Pt}$) of Pt—Pt is 0, that is, there is no another Pt atom in the spatial range of 0.3 nm around Pt in the entire catalyst structure, thereby demonstrating microscopically and macroscopically that Pt in the catalyst prepared in Example 2 is single-atomic dispersed.

Proof of Single Atom of Pt in 0.05% Pt/α-MoC$_{0.8}$ Supported Single-Atomic Dispersion Catalyst Prepared in Example 3

Figure 4:
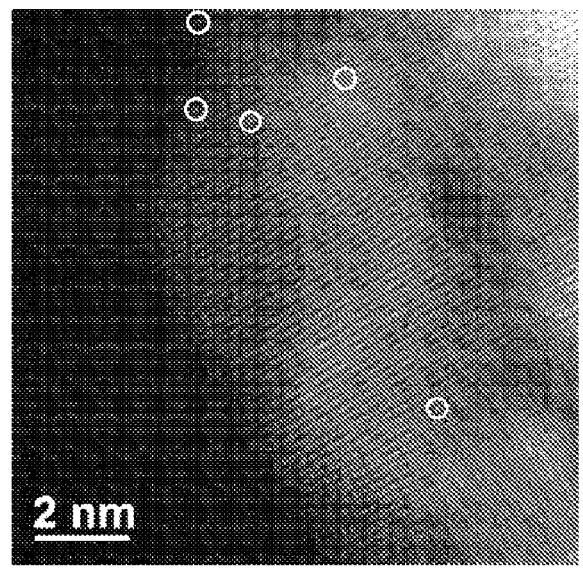
FIG. 4 is a scanning transmission electron micrograph of the catalyst prepared in Example 3.

The catalyst prepared in Example 3 was characterized by transmission electron microscopy, and the results are shown in FIG. 4. As can be seen from FIG. 4, Pt atoms are all dispersed on the α-MoC$_{0.8}$ support in the form of single atom.

Proof of Single Atom of Pt in 2% Pt/α-MoC$_{0.8}$ Supported Single-Atomic Dispersion Catalyst Prepared in Example 4

Figure 5:
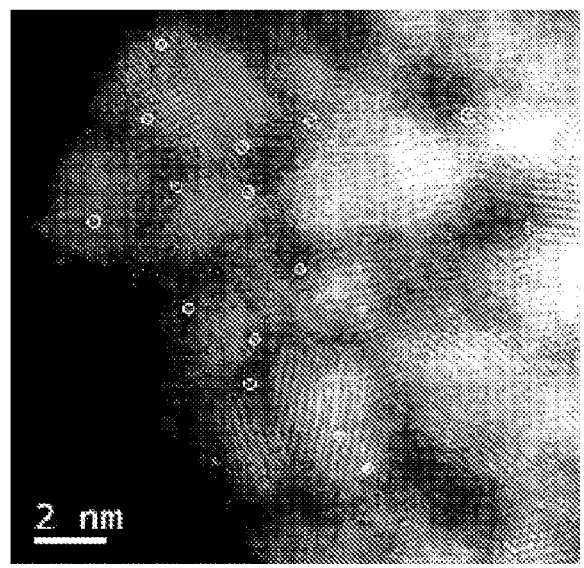
FIG. 5 is a scanning transmission electron micrograph of the catalyst prepared in Example 4.

The catalyst prepared in Example 4 was characterized by transmission electron microscopy, and the results are shown in FIG. 5 and Table 2. As can be seen from FIG. 5, Pt atoms are uniformly present on the α-MoC$_{0.8}$ support in the form of single atom (as shown in the circle), the Pt particles are hardly observed.

Combined with EXAFS fitting analysis, the amount of Pt single atom is about 90% of the total Pt mass loaded on the support.

TABLE 2

EXAFS Data Fitting of Pt L3 Absorption Edge of 2% Pt/α-MoC$_{0.8}$ Supported Single-Atomic Dispersion Catalyst

| Catalyst | Coordination Shell | Bond Length Å | Coordination Number | E0 Displacement (eV) | Structural Disorder |
|---|---|---|---|---|---|
| 2% Pt/α-MoC$_{0.8}$ | Pt—Pt | 2.78 +/− 0.01 | 4.8 +/− 0.7 | 6.4 | 0.005 |
| | Pt—Mo | 2.78 +/− 0.01 | 3.2 +/− 0.7 | | 0.006 |

Proof of Single Atom of Pt in 10% Pt/α-MoC$_{0.8}$ Supported Single-Atomic Dispersion Catalyst Prepared in Example 10

Figure 6:
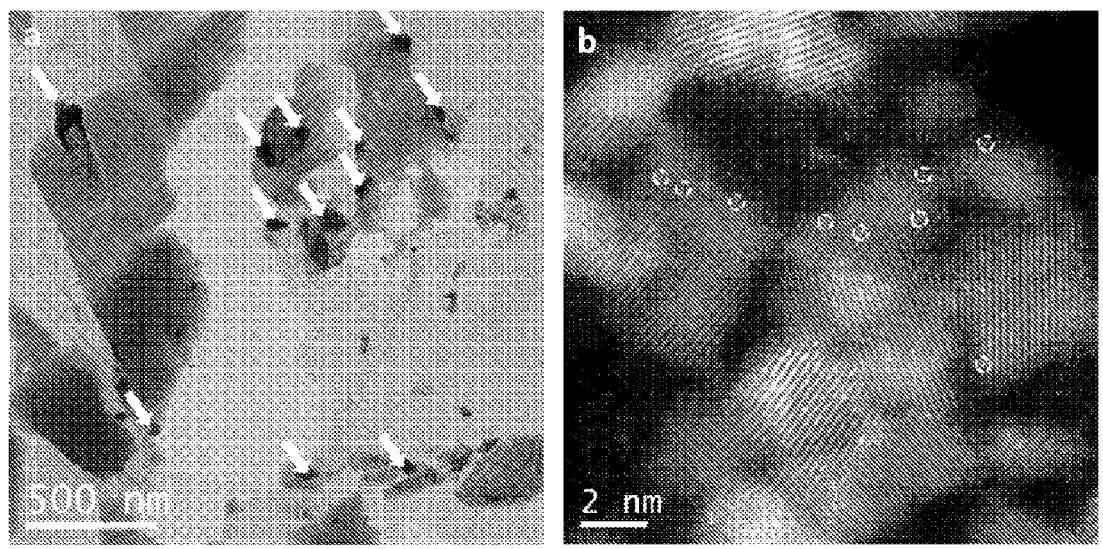
FIG. 6 is a scanning transmission electron micrograph of the catalyst prepared in Example 10, wherein a and b are scanning transmission electron micrographs at different scales respectively.

The catalyst prepared in Example 10 was characterized by transmission electron microscopy. The results are shown in FIG. 6 and Table 3. As can be seen from the graph a in FIG. 6, when the loaded amount reaches 10%, more Pt particles appear on the catalyst. As can be seen from the graph b in FIG. 6, there is a part of the Pt single atom remaining on the catalyst. Also combined with XAFS fitting data, the coordination number of Pt—Mo is 2.7, which is mainly contributed by the interaction between Pt single atom and the support molybdenum carbide. The coordination number of Pt—Pt is 5.2, which is mainly contributed by Pt particles. The amount of Pt single atom is about 10% of the total Pt mass loaded on the support.

TABLE 3

EXAFS data fitting of Pt L3 edge of 10% Pt/α-MoC$_{0.8}$ supported single-atomic dispersion catalyst

| Catalyst | Coordination Shell | Bond Length Å | Coordination Number | E0 Displacement (eV) | Structural Disorder |
|---|---|---|---|---|---|
| 10% Pt/α-MoC$_{0.8}$ | Pt—Pt | 2.75 +/− 0.01 | 5.2 +/− 1.0 | 5.9 | 0.005 |
| | Pt—Mo | 2.75 +/− 0.01 | 2.7 +/− 0.7 | | 0.003 |

Catalytic Performance Test in the Hydrogen Production of Alcohol Aqueous Phase Reforming The supported catalysts prepared in Examples 2-9 and Comparative Examples 1-5 were used in the methanol aqueous phase reforming reaction under the following conditions: a closed system reaction, in which a certain proportion of methanol and water were added to the reaction system (the reaction was carried out according to the optimal ratio of catalyst), and the reaction was carried out under 2 MPa $N_2$ (10% Ar as an internal standard) protective gas, after the temperature was cooled to room temperature, the gas phase product was detected by gas chromatography. The reaction performance of each catalyst is shown in Table 4 below.

Wherein activity evaluation conditions of Examples 2-6, Comparative Example 1-2 and Comparative Example 5 were as follows: n (methanol):n (water)=1:1, reaction temperature was 190° C., and the reaction was carried out for 1 hour, and the activity was represented by ATOF (Aver TOF; average conversion frequency: moles of reactants converted on metal per mole in one hour).

Activity evaluation conditions of Examples 7-9, Comparative Example 3-4 were as follows: n (methanol):n (water)=1:1, reaction temperature was 240° C., the reaction was carried out for 3 hour, and the activity was represented by μmol/g/s.

TABLE 4

Comparison of catalytic performance of the catalysts in hydrogen production of alcohol aqueous phase reforming

| Catalyst | Temperature (° C.) | ATOF (h$^{-1}$) | μmol/g/s | $n_{CO}/n_{H2}$ % |
|---|---|---|---|---|
| Example 1 α-MoC$_{0.8}$ | 240 | — | 1.2 | 0.83 |
| Example 2 0.2% Pt/α-MoC$_{0.8}$ | 190 | 22557 | 93.2 | 0.14 |
| Example 3 0.05% Pt/α-MoC$_{0.8}$ | 190 | 23150 | 16.4 | 0.09 |
| Example 4 2% Pt/α-MoC$_{0.8}$ | 190 | 5025 | 143.2 | 0.06 |
| Example 5 2% Pd/α-MoC$_{0.8}$ | 190 | 2325 | 121.9 | 0.07 |
| Example 6 2% Ru/α-MoC$_{0.8}$ | 190 | 2130 | 117.2 | 0.05 |
| Comparative Example 1 2% Pt/α-MoC$_{1-x}$ | 190 | 852 | 24.3 | 0.12 |
| Comparative Example 2 2% Pt/Al$_2$O$_3$ | 190 | 103 | 2.9 | 0.07 |
| Comparative Example 5 层状 Pt/α-MoC$_{1-x}$ | 190 | 8630 | 201 | 0.09 |
| Example 7 Ni/α-MoC$_{0.8}$ | 240 | | 95.7 | 0.71 |
| Example 8 Cu/α-MoC$_{0.8}$ | 240 | | 1.81 | 0.07 |
| Example 9 Co/α-MoC$_{0.8}$ | 240 | | 1.4 | 0.07 |
| Comparative Example 3 Ni/Mo$_2$C | 240 | | 18.5 | 1.7 |
| Comparative Example 4 Ni/Al$_2$O$_3$ | 240 | | 7.8 | 26.8 |

Figure 7:
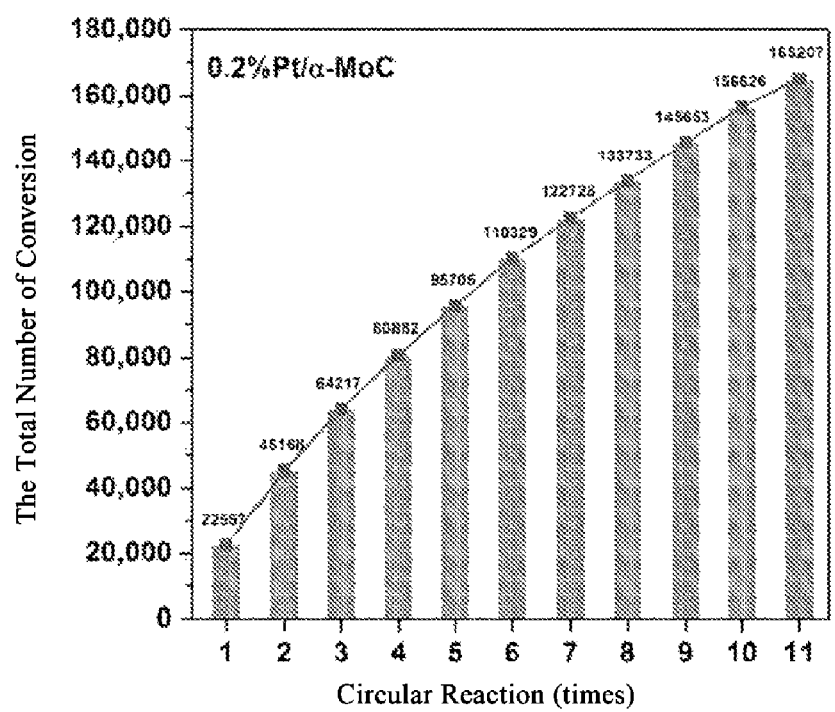
FIG. 7 is a catalytic effect graph of the catalyst prepared in Example 2 in a plurality of repeated catalytic reactions.

It can be seen from Table 4, the catalytic activity of the catalyst prepared in each example of the present application is significantly higher than that of the catalyst prepared in the comparative example. Meanwhile, the catalyst of the present application not only has a relatively high hydrogen production rate and low CO selectivity, but also is far lower than the tolerance of the high temperature hydrogen fuel cell to CO, and it overcomes the weakness of the low catalytic activity and high CO selectivity of the Pt catalyst loaded by the oxide support; especially the catalyst prepared in Examples 2 and 3, its TOF activity is as high as 22557 h$^{-1}$ and 23150 h$^{-1}$. In addition, the catalytic reaction was repeated using the catalyst of Example 2 (the reaction conditions were the same as that in Table 4), after each reaction, the composition of the gas in the reaction was detected by gas chromatography, and the amount of the substance of each component was determined by the content of the internal standard, and the reaction rate was calculated finally. The result is shown in FIG. 7, it can be seen from FIG. 7 that the catalyst prepared by the present application has good stability and can be used repeatedly for the catalytic reaction multiple times.

Figure 8:
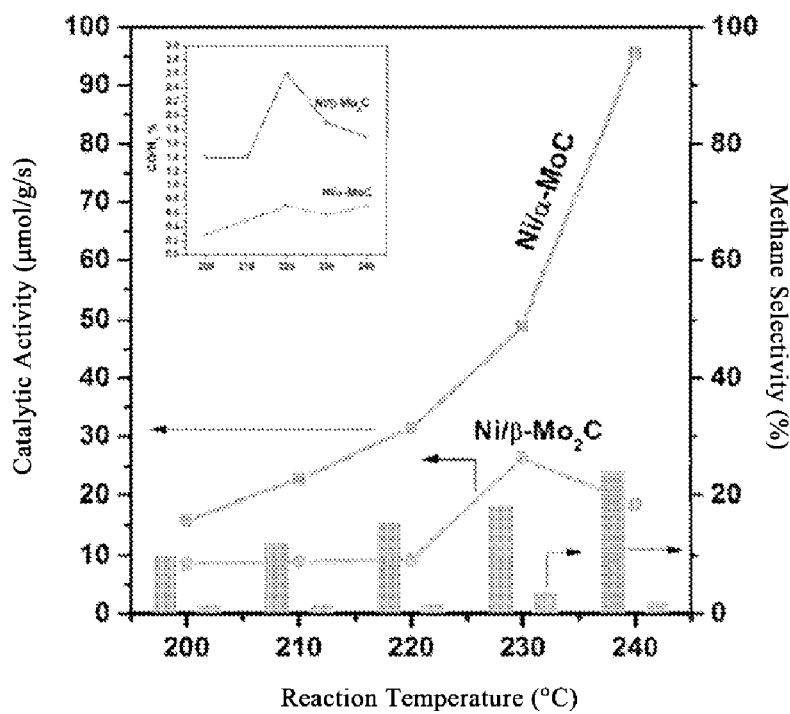
FIG. 8 is a graph showing the catalytic activity of the catalysts prepared in Example 7 and Comparative Example 3 at different temperatures.

In order to investigate the optimum reaction temperature of the Ni\Cu\Co catalyst provided by the present application, specifically, the catalysts prepared in Example 7 and Comparative Example 3 were taken as an example, the catalytic reaction was carried out at different temperatures under the conditions of n(methanol):n (water)=1:1 and performing reaction for 3 hours. The result is shown in FIG. 8, it can be seen from FIG. 8 that the activity of Ni/α-MoC$_{0.8}$ prepared in Example 7 is increased significantly in this reaction as the temperature increased and the activity is the highest at 240° C.

Figure 9:
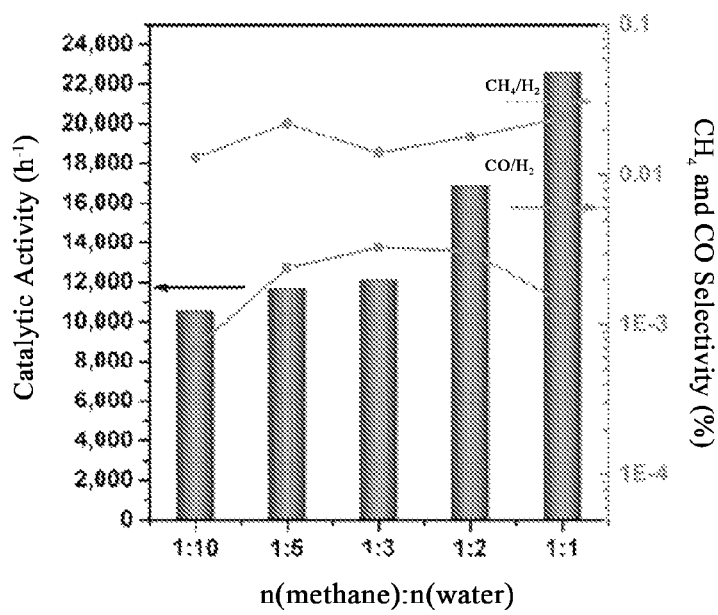
FIG. 9 is a graph showing the optimization of the molar ratio of methanol to water for the catalyst prepared in Example 2.
Figure 10:
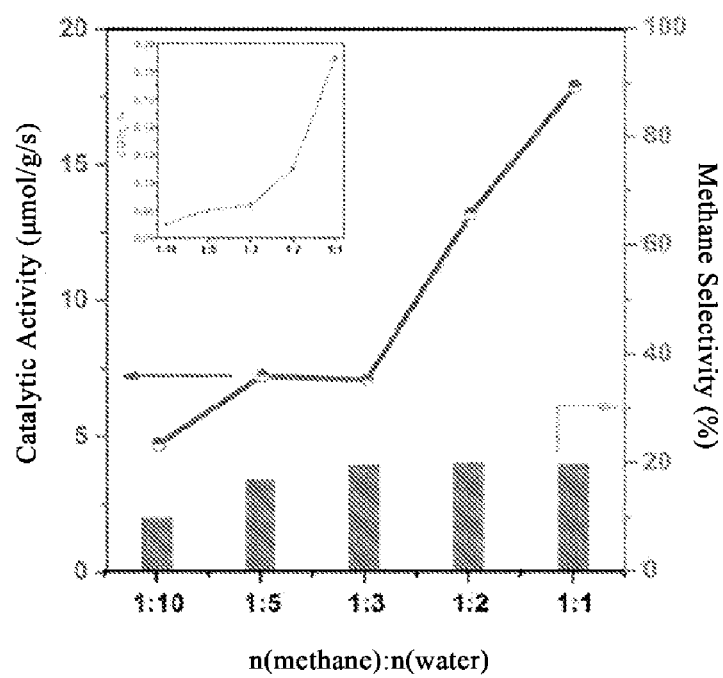
FIG. 10 is a graph showing the optimization of the molar ratio of methanol to water for the catalyst prepared in Example 7.

In order to investigate the optimum alcohol-water ratio of the catalyst provided by the present application, the alcohol-water ratio optimization test was carried out by taking Example 2 and Example 7 as an example. Specifically, the reaction temperature of Example 2 was 190° C., and the reaction time was 1 hour; the reaction temperature of Example 7 was 240° C. and the reaction was carried out for 3 hours. The results are shown in FIG. 9 and FIG. 10, it can be seen that the optimum alcohol-water ratio of Example 2 and Example 7 is n (methanol):n (water)=1:1.

Each of the catalysts prepared in the present application not only has a remarkable catalytic effect on methanol, but also has good catalytic performance on other alcohols. Table 5 shows the results of the hydrogen production of aqueous phase reforming of ethanol, ethylene glycol, and glycerin using the examples of the present application.

Specifically, the supported catalysts prepared in Example 2 and Example 7 are used in the aqueous alcohol reforming reaction under the following conditions: a closed system reaction, in which a certain proportion of alcohol (ethanol, ethylene glycol, and glycerin) and water was added to the reaction system, and the reaction was carried out under 2 MPa N$_2$ (10% Ar as an internal standard) protective gas, after the temperature was cooled to room temperature, the gas phase product was detected by gas chromatography. The reaction performance of each catalyst is shown in Table 5 below.

Wherein the activity evaluation conditions of Example 2: n (alcohol):n (water)=1:1, the reaction temperature was 210° C., and the reaction was carried out for 1 hour, and the activity was represented by ATOF.

The activity evaluation conditions of Example 7: n (alcohol):n (water)=1:1, the reaction temperature was 210° C., and the reaction was carried out for 3 hour, and the activity was represented by μmol/g/s.

TABLE 5

The reaction performance of the catalysts of Example 2 and Example 7 for catalyzing the hydrogen production of aqueous phase alcohol reforming

| Catalyst | Alcohol | Temperature (° C.) | ATOF (h$^{-1}$) | μmol/g/s | nCO/nH$_2$ % |
|---|---|---|---|---|---|
| Pt/α-MoC$_{0.8}$ | Ethanol | 210 | 1275 | | — |
| Pt/α-MoC$_{0.8}$ | Glycerin | 210 | 874 | | 0.12 |
| Pt/α-MoC$_{0.8}$ | ethylene glycol | 210 | 608 | | 0.07 |
| Ni/α-MoC$_{0.8}$ | Ethanol | 240 | | 50.2 | 0.5 |
| Ni/α-MoC$_{0.8}$ | Glycerin | 240 | | 28.4 | 0.9 |
| Ni/α-MoC$_{0.8}$ | ethylene glycol | 240 | | 28.7 | 0.7 |

As can be seen from Table 5, in addition to methanol, the catalyst provided by the present application has excellent catalytic properties for other alcohols.

In summary, the catalyst prepared by the preparation method of the metal/α-MoC$_{1-x}$ supported single-atomic dispersion catalyst provided by the present application, in which the metal is uniformly dispersed on the support α-MoC$_{1-x}$ in single atom form, can improve the coverage of "—OH" on the catalyst surface more effectively, and the "—OH" is favorable for the metal to catalyze the "—CH" cleavage so that promotes the alcohol reforming reaction and inhibits the decomposition reaction.

The above description is only the preferred example of the present application, and is not intended to limit the present application. Any modifications, equivalent substitutions, improvements, etc., which are made within the spirit and principles of the present application, should be included within the scope of protection of the present application.

The invention claimed is:

1. A catalyst comprising:
 a metal and α-MoC$_{1-x}$,
 wherein the α-MoC$_{1-x}$ is a support and the metal is an active component dispersed on the α-MoC$_{1-x}$ support,
 wherein 10-100% of the metal dispersed on the α-MoC$_{1-x}$ support is in a single-atomic form,
 wherein in the α-MoC$_{1-x}$ support, x is 0-0.9, and
 wherein the metal is at least one selected from the group consisting of platinum, ruthenium, palladium, nickel, copper, and cobalt.

2. The catalyst of claim 1, wherein 90-100% of the metal dispersed on the α-MoC$_{1-x}$ support is in a single-atomic form.

3. The catalyst of claim 1, wherein the metal dispersed on the α-MoC$_{1-x}$ support is 0.01-50% by mass, based on a total mass of the α-MoC$_{1-x}$ support with the metal dispersed thereon.

4. The catalyst of claim 1, wherein the metal dispersed on the α-MoC$_{1-x}$ support is 0.01-10% by mass, based on a total mass of the α-MoC$_{1-x}$ support with the metal dispersed thereon.

5. The catalyst of claim 1, wherein the α-MoC$_{1-x}$ support has a size of between 1-30 nm.

6. The catalyst of claim 1, wherein the α-MoC$_{1-x}$ support has a specific surface area of between 5-250 m$^2$/g.

7. A method for preparing the catalyst of claim 1, comprising:
1) synthesizing the $\alpha$-MoC$_{1-x}$ support;
2) dissolving a metal precursor salt to obtain a metal precursor salt solution, wherein the metal precursor salt is a precursor salt of the metal;
3) mixing the metal precursor salt solution in step 2) with the $\alpha$-MoC$_{1-x}$ support in step 1) to form a mixture;
4) drying the mixture to obtain a solid, wherein the metal of the metal precursor salt has a mass of between 0.01%-55% of a mass of the $\alpha$-MoC$_{1-x}$ support with the metal precursor salt mixed thereon;
5) lyophilizing the obtained solid in step 3) to obtain a catalyst precursor; and
6) carburizing the catalyst precursor in a carburization gas atmosphere containing both a carbon source and a hydrogen source to obtain the catalyst.

8. The method of claim 7, wherein the metal precursor salt is a water-soluble salt.

9. The method of claim 8, wherein the metal precursor salt is at least one selected from the group consisting of dipotassium tetrachloroplatinate, disodium tetrachloroplatinate, platinum bis(acetylacetonate), chloroplatinic acid, palladium chloride, palladium acetate, nickel chloride, copper chloride, cobalt chloride, nickel nitrate, copper nitrate, cobalt nitrate, nickel acetylacetonate, copper acetylacetonate, and cobalt acetylacetonate.

10. The method of claim 7, wherein the metal precursor salt comprises the metal having a mass of between 0.01%-12% of a total mass of the $\alpha$-MoC$_{1-x}$ support with the metal precursor salt thereon.

11. The method of claim 7, wherein:
the carbon source is at least one selected from the group consisting of alkane, olefin and alcohol;
the hydrogen source is hydrogen gas;
the volume ratio of the carbon source to the hydrogen source is of between 0.1:9 to 9:1;
the heating rate of temperature programming for carburization is 1-50° C./min; and
the carburization comprises a highest temperature step of between 490-900° C.

12. The method of claim 11, wherein the carburization comprises a temperature step performed at between 200-300° C. for of between 0.1-50 hours and the highest temperature step is then performed of between 490-900° C. for of between 0.1-100 hours.

13. Use of the catalyst of claim 1 for the hydrogen production reaction of an alcohol aqueous phase reforming, comprising:
contacting the catalyst with an aqueous solution of an alcohol in a closed system at a reaction temperature to produce hydrogen.

14. The use of claim 13, wherein the alcohol is selected from the group consisting of methanol, ethanol, glycerin and ethylene glycol.

15. The use of claim 13, wherein the reaction temperature of the hydrogen production reaction of the alcohol aqueous phase reforming is of between 50-280° C.

16. The use of claim 13, wherein the aqueous solution of the alcohol comprises the alcohol and water in a ratio of between 0.1:9 to 10:1.

* * * * *